United States Patent [19]
Roxby et al.

[11] Patent Number: 5,585,616
[45] Date of Patent: Dec. 17, 1996

[54] CAMERA FOR CAPTURING AND DECODING MACHINE-READABLE MATRIX SYMBOL IMAGES APPLIED TO REFLECTIVE SURFACES

[75] Inventors: Donald L. Roxby; Lisa M. Johnson, both of Huntsville, Ala.

[73] Assignee: Rockwell International Corporation, Seal Beach, Calif.

[21] Appl. No.: 435,356

[22] Filed: May 5, 1995

[51] Int. Cl.$^6$ .................................................. G06K 7/10
[52] U.S. Cl. .................. 235/472; 235/454; 235/470; 235/462; 250/208.6; 250/566; 250/568; 250/553
[58] Field of Search .................................. 235/472, 460, 235/462, 470, 454, 456, 469; 250/208, 566, 568, 553, 208.6

[56] References Cited

U.S. PATENT DOCUMENTS

| | | | |
|---|---|---|---|
| 3,662,181 | 5/1972 | Hercher et al. | 250/219 D |
| 3,800,282 | 3/1974 | Acker | 235/470 X |
| 3,801,775 | 4/1974 | Acker | 235/470 |
| 4,158,194 | 6/1979 | McWaters et al. | 340/146.3 |
| 4,488,679 | 12/1984 | Bockholt et al. | 235/469 |
| 5,198,650 | 3/1993 | Wike, Jr. | 235/472 |
| 5,291,008 | 3/1994 | Havens et al. | 235/472 X |
| 5,313,373 | 5/1994 | Bjorner et al. | 362/19 |
| 5,354,977 | 10/1994 | Roustaei | 235/472 |
| 5,408,084 | 4/1995 | Brandorff et al. | 235/472 X |
| 5,428,212 | 6/1995 | Tani et al. | 235/472 |
| 5,434,403 | 7/1995 | Amir et al. | 235/472 |
| 5,449,892 | 9/1995 | Yamada | 235/472 X |
| 5,484,994 | 1/1996 | Roustaei | 235/462 |

*Primary Examiner*—Donald T. Hajec
*Assistant Examiner*—Michael G. Lee
*Attorney, Agent, or Firm*—Charles T. Silberberg; Lawrence N. Ginsberg; Terrell P. Lewis

[57] ABSTRACT

The present invention relates to a method and an apparatus for enhancing the optical image of information-containing symbols captured off reflective surfaces/using a conventional optical scanning camera. The method involves positioning the imaging assembly of the camera atop an information-containing coded symbol located on a component surface, where the imaging assembly includes a diffuser element and LED lighting array for illuminating the symbol, illuminating the surface and the symbol, and moving the diffuser element to a location between the coded symbol and the camera lens such that only light returning directly from the symbol is able to pass through the voided region of the diffuser element, before imaging the coded element.

17 Claims, 4 Drawing Sheets

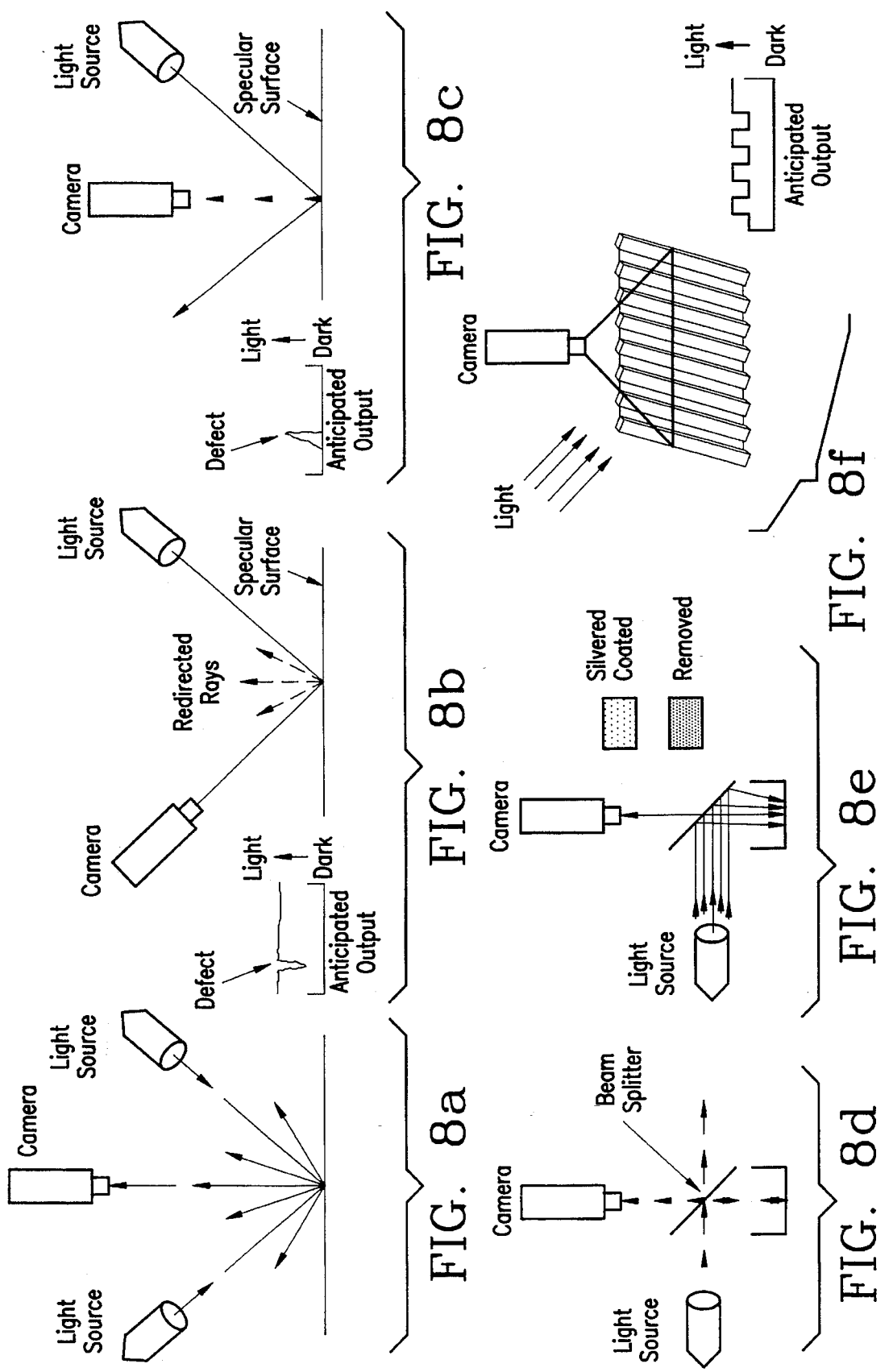

CAMERA FOR CAPTURING AND DECODING MACHINE-READABLE MATRIX SYMBOL IMAGES APPLIED TO REFLECTIVE SURFACES

BACKGROUND OF THE INVENTION

1. Field of the Invention

The present invention relates to cameras used to image human-readable and machine-readable markings, and more particularly, to an improved camera apparatus for capturing and decoding images of one and two dimensional bar codes, matrix symbols and optical character recognition markings from various surfaces, including rough or reflective surfaces.

2. Description of the Related Art

Many industries, including those involving component assembly, processing, or inventorying, use an identification system in which products are marked with machine-readable parts identification markings, such as bar code symbols, two-dimensional matrix symbols, and optical character recognition symbols, all of which contain information about the products.

A number of different readers and laser scanning devices have been developed to decode symbol patterns to a multiple numeric or alpha/numeric representation. These "optical scanners" are available in numerous configurations, and are either incorporated into fixed station apparatus or portable apparatus.

Portability of an optical scanner enhances its ability to inventory products on shelves and to track portable items such as files, spare parts or small equipment. Portable scanning devices typically allow the user to scan the coded symbols at various distances from the surface on which the coded symbol is located. One problem associated with such scanners is that they are unable to read coded symbols located on highly reflective or polished surfaces. A second problem is their high cost of manufacture.

Coded-symbol scanners that use light emitting diodes (LEDs) as a light source and a charged coupled device (CCD) or complementary metal-oxide semi-conductor (CMOS) as detectors are also known. These image camera scanners are generally referred to as "CCD" and "CMOS" scanners. While CCD and CMOS scanners have the advantage of being less expensive to manufacture, they nevertheless require that the equipment be maintained in contact, or at least in close proximity, with the surface on which the symbol is located.

However, the imaging capabilities of such cameras are typically adversely affected by specular reflection from smooth, polished, or other highly reflective surfaces, or by shadowing produced by minor surface defects, or by patterns or surface textures produced as a result of machining.

The solid state image sensor used in CCD and CMOS cameras comprises a matrix array of light sensitive monolithic silicon chips ("pixels") which absorb photons. A typical 512×512 matrix sensor array contains 262,144 chips.

During operation, the solid-state image sensor converts incident light to electric charge which is integrated and stored until the time of readout. The integrated charge is directly proportional to the intensity of the light on the sensing elements. Readout is initiated by a periodic start or transfer pulse. The charge information is then sequentially read out at a rate determined by clock pulses applied to the image sensor. The output is a discrete time analog representation of the spatial distribution of light intensity across the array.

One notable disadvantage of using CCD cameras in imaging ("capturing") machine-readable symbols is a phenomenon known as "blooming", a condition which can severely degrade the performance of the image sensor and can cause problems with the camera circuitry. Blooming occurs when an excessive number of light generating electrons are produced. The result is that bright parts of the image smear and spread out into the surrounding darker areas of the image creating false responses from the pixels in those areas. The effect appears similar to the petals of a flower blooming out from a bud; hence, the name "blooming".

The total charge in any given pixel is the result of photon absorption which creates electrons that accumulate over the integration period; thus, the total photo-electron generation ("photocurrent"). The brighter the light intensity, the higher the photocurrent. Excessive charge can be created by either excessive illumination or too lengthy an integration time. The excessive charge cannot be completely discharged within the average time a human can hold such cameras still (normally 1/60 second), so it leaks past the transfer gate of the CCD and appears as a vertical stripe on a video monitor. An even greater intensity light produces a charge that not only leaks past the transfer gate, but also past the channel stoppers of the other pictures, thus causing a washout area in the video image. This condition is technically known as depth overflow.

These problems generally arise as a result of the use of direct lighting, and can be overcome in most fixed station camera applications by controlling the external lighting conditions using special equipment, as for example, portable studio lights, filters and reflectors. This external equipment, however, is not practical for use in the field where lighting conditions change on a continual basis.

For example, to overcome the problem of specular reflection, field use cameras can be operated in a "touch" mode, where the optical windows of the cameras are pressed against a substrate's surface atop the coded symbol to be imaged in order to block out all incident light. The surface is then illuminated with a built-in light source which emits light having an optimum intensity, angle and wavelength. Cameras of this type are extremely effective for imaging high quality paper labels applied to flat surfaces, but they are ineffective for acquiring images from rough or reflective materials or curved surfaces.

Moreover, various part identification and data capture companies have tried to create non-contact (i.e., "non-touch") cameras which are able to capture and decode machine-readable symbols from non-paper substrates, but these efforts have not produced much success.

Exemplary symbol reading cameras are known from U.S. Pat. No. 4,742,220 to Beyor, U.S. Pat. No. 3,961,198 to August, U.S. Pat. No. 4,743,773 to Katana et al., U.S. Pat. No. 4,818,847 to Hara et al., U.S. Pat. No. 4,825,057 to Swartz, U.S. Pat. No. 4,900,907 to Matusima et al., U.S. Pat. No. 4,908,500 to Bamberger, U.S. Pat. No. 4,983,817 to Dolash, U.S. Pat. Nos. 5,291,009 and 5,354,977 to Roustaei, and U.S. Pat. No. 5,350,909 to Powell et al.

None of these cameras, however, are effective in any mode to permit optical imaging of encoded symbols from polished or reflective surfaces.

OBJECTS AND SUMMARY OF THE INVENTION

A principal object of the present invention, therefore, is to provide an improved method and apparatus for using "stand-off" or non-touch cameras to optically image information-containing encoded symbols which have been placed on reflective or curved substrates, while overcoming many of the drawbacks and disadvantages of known similar methods and apparatus.

Another object of the present invention is to provide an improved method and apparatus for optically imaging machine-readable markings, such as bar code, two-dimensional matrix symbols, and OCR markings, located on rough or highly reflective using a stand-off optical scanning camera including an illumination assembly for projecting light directly towards and onto the symbol, and a diffuser element for softening the light projected onto, as well reflected back to the lens from, the symbol.

These and other objects are accomplished by providing the camera head with an array of LED light sources disposed in a hooded illumination unit, and a diffuser element positioned in front of the LED light sources.

The camera head also carries the camera's imaging optical element (eg., a lens) to permit optical capture of the LED light reflected from the symbol.

The LED light sources are arranged about the imaging lens in predetermined arrays to provide optimum, soft light, illumination on the marking. The diffuser element, positioned in front of the LED light sources and the camera's imaging optical element, preferably is substan-tially planar, and includes a radially inner, voided region and a radially outer solid region. The radially inner portion of the diffuser element is located directly in line with the camera's lens. The radially outer portion is disposed in front of the LED light sources to break up and scatter, and thereby soften, the harsh light emanating from the LED array. The light, which is projected onto the marking, passes through the solid portion of the diffuser element.

The diffuser element permits light reflected from the symbol and surface to be returned back to the camera lens, but only through the radially inner, annular portion of the diffuser. The size and position of the diffuser opening are determined by the size of the camera lens used and the light projection cone angle of the LEDs. The opening must provide the camera lens with an undisturbed view of the marking and prevent any direct (harsh) light from escaping through the opening to the marking.

Other objects, advantages, and novel features of the present invention will become apparent from the following detailed description of the invention when considered in conjunction with the accompanying drawings.

BRIEF DESCRIPTION OF THE DRAWINGS

FIGS. 8a–8f depict six different lighting arrangements which can be used in conjunction with the camera apparatus of the present invention to enhance the amount of light projected onto the symbol.

DETAILED DESCRIPTION OF THE PREFERRED EMBODIMENTS

Figure 1A:
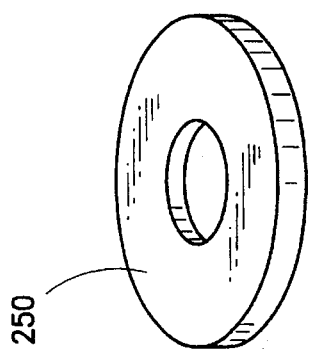
FIGS. 1a–1c shows the basic elements of a conventional bar code symbol, a conventional human-readable OCR font, and a conventional matrix code symbol.
Figure 1B:
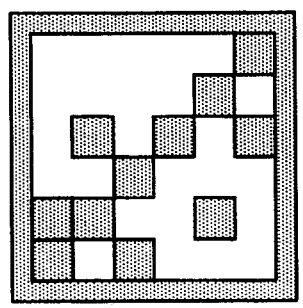
Figure 1C:

A conventional bar code symbol 10 is shown in FIG. 1c. The bar code symbol typically consists of a running sequence of different width bars and spaces arranged in a linear array. This sequence of bars and spaces, as well as the thicknesses of the bars, correlates to dots and dashes of Morse code, and software packages used to decipher these codes are based on this principle. Bar codes are generally recognized as an efficient method of entering data into a database.

FIG. 1b shows a typical pattern of dots representing human-readable numbers applied using a machine readable optical character recognition (OCR) font.

FIG. 1a shows a typical two-dimensional matrix symbol 12. All data in a matrix symbol is represented by a sequence of equal size units, i.e., data cells 14. Each sequence of data cells can include any combination of black cells (which are typically used to represent a binary "1") and white cells (which are typically used to represent a binary "0"). When arranged together in specific sequences, a variety of alpha/numeric characters can be represented. The equal size and binary valuation of data cells enable ease of decoding in a logic decision process. Moreover, matrix codes are decodable from any direction or orientation, i.e., left, right, top or bottom.

One example of a matrix symbol and its manner of use, which is well-known in the art, is the Vericode® symbol. This symbol is disclosed, described, and claimed in U.S. Pat. Nos. 4,924,078 and 4,972,475.

Figure 2:
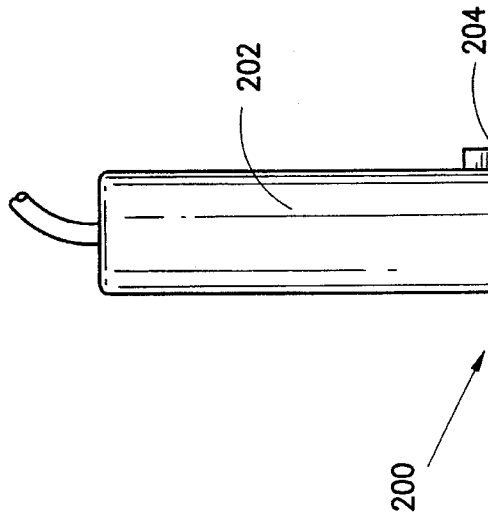
FIG. 2 is a schematic view of a hand-held "stand-off" version of the camera apparatus of the present invention disposed in a position over a coded symbol for imaging the symbol.

FIG. 2 illustrates the camera apparatus 200 of the present invention shown positioned atop a coded symbol 222 on a substrate for imaging the information encoded in the symbol (shown here as a matrix symbol). The encoded symbols are typically applied to a surface 224 of a component 226, and are produced by code generation software, preferably embodied within a computer. Such computers can be of the desk-top or portable class.

Information which can be included in a machine-readable marking includes a description of the product or component, the place of manufacture, the last repair or last service, current location of the product, its destination, its owner, the current date, the date on which it is to be shipped, the cargo carrier or container into which it is scheduled to be placed, etc.

The output of the symbol or OCR code/decode software is a sequence of numeric and alpha/numeric data values which are converted to cell representations in the information-containing symbol.

Preferably, a marking device driver software package is coupled with the computer to interface with the code generation software package. Methods and apparatus for marking information-containing symbols onto substrate materials have been described in applicants' co-pending patent application U.S. Ser. No. 08/164,492, filed on Dec. 8, 1993, the subject matter of which is incorporated herein by reference.

The camera apparatus 200 is shown in FIG. 2 disposed in an imaging position over an information-containing symbol 222 (shown here as a matrix symbol) located on a substrate 224. The encoded symbol is "captured" using a CCD optical camera 202, including a two-position trigger 204 coupled with the camera, and a head 206 containing the camera's optical assembly, light source, and light diffuser element 250 (to be described in greater detail below). The head 206 may be pivotably connected with the body of the camera 202 to enable to camera body to be held at an angle to, or parallel with, the surface on which is located the symbol to be imaged.

Figure 6:
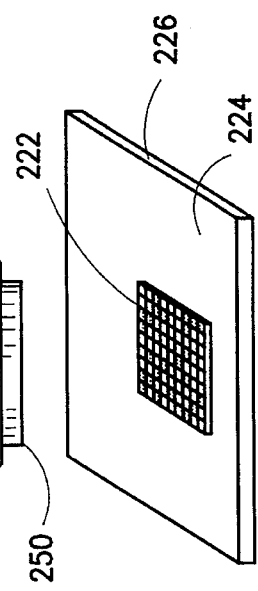
FIG. 6 is a perspective view of the diffuser element of the present invention.
Figure 3A:
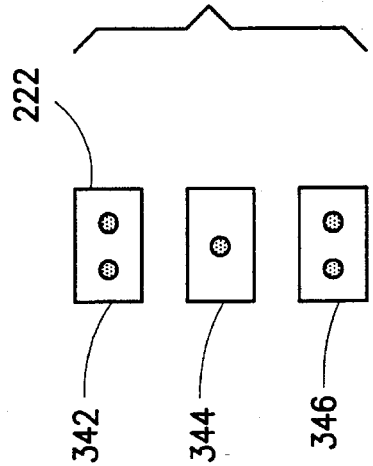
FIG. 3a shows the focussing beams on the surface.
Figure 3:
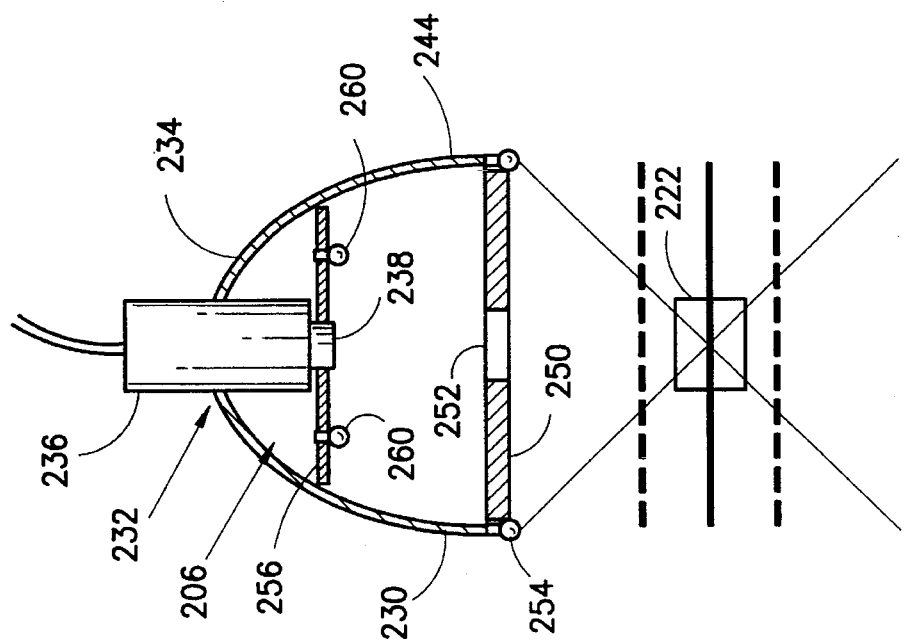
FIG. 3 is a side sectional view of the camera lens assembly and lighting head of the present invention disposed above an encoded symbol in a first stage of operation.
Figure 5:
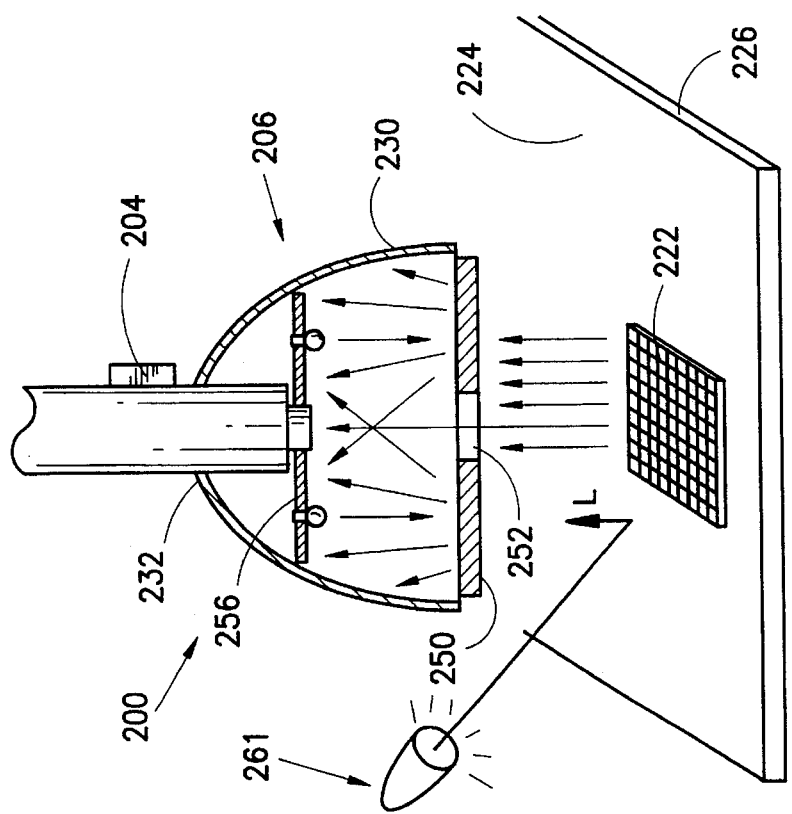
FIG. 5 is a side sectional view of the camera lens assembly and lighting head of the present invention disposed above an encoded symbol in a third stage of operation.
Figure 4:
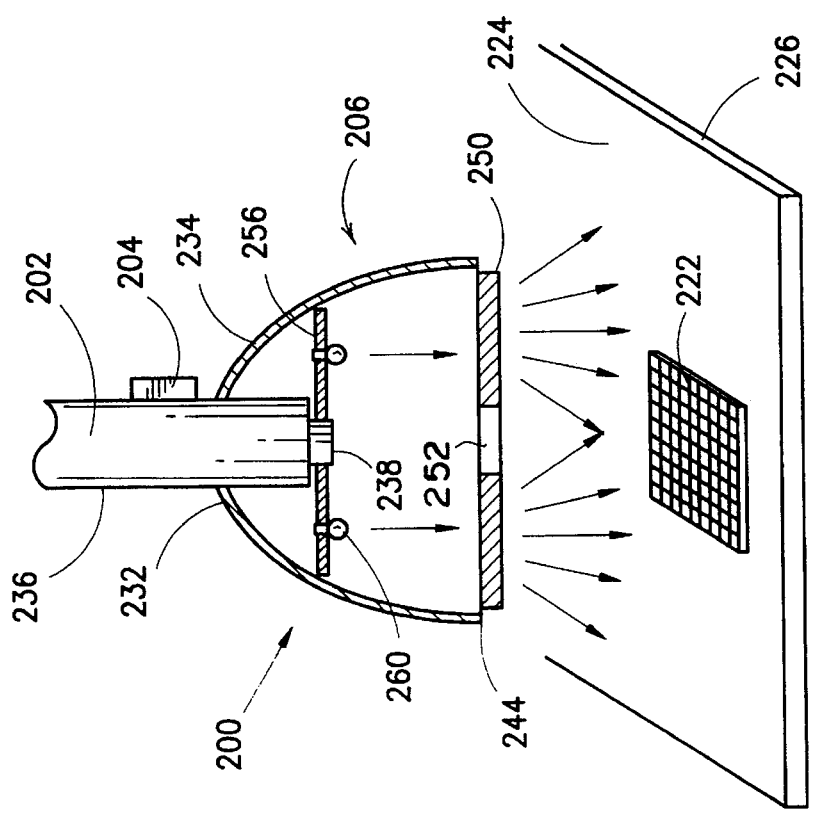
FIG. 4 is a side sectional view of the camera lens assembly and lighting head of the present invention disposed above an encoded symbol in a second stage of operation.

Referring now to FIGS. 3, 4 and 5, the head 206 of the camera apparatus includes a bowl-shaped housing 230 having an opening 232 located at the upper, closed end 234 of the housing for receipt of a portion of the camera body 236 and the camera's lens 238. Preferably, the camera's lens is disposed centrally of the bowl-shaped housing. Positioned adjacent the other, open end 244 of the housing is an annular, light-diffusing element 250 (see also FIG. 6) having a central opening 252 axially aligned with the line of sight of the camera's lens. Two laser projection focusing lights 254, 254 are attached diametrically to the rim of the housing about line of sight of the camera's lens. The focusing lights are actuated in an initial focusing step to enable the determination of the correct location at which the lens must be placed from the symbol for proper imaging of the symbol. In FIG. 3a, the boxes represent patterns of the light beams formed on the substrate when the beams fall on the symbol to be imaged. The upper and lower boxes 342, 346 show separated dots at the symbol 222, and indicate that the lens is too close or too far from the symbol. The center box shows a single dot at the symbol, a sign that the lens is at a correct distance from the symbol.

Attached to and disposed about the camera's lens 238 is a disk 256 which carries a lighting array 260 for projecting light onto the encoded symbol 222 carried by the component 224. The lighting array preferably includes eight or more LED lamps 262, 263 arranged in a predetermined pattern to provide a predetermined intensity of light. Preferably, the lamps of the array are disposed symmetrically about the camera's lens 238, and are located at a predetermined distance from the light-diffusing element 250.

The distance between the diffuser and the LED lamps is determined by the cone angle of the light beam. The diffuser is positioned at a distance that allows the maximum amount of light to strike the diffuser without spilling over and through the camera viewing window. The inside surface of the light head should be matte white in color to reflect and diffuse light entering the cavity. A clear light-transparent cover can be used to prevent dust from entering the light head.

Images of symbols are "captured" with a CCD camera by actuating the trigger of the camera to freeze a single frame of a continuous analog video signal stream (RS-170), and then converting the single frame image to a digital signal (RS-232) to create a digital representation of the image, i.e., as a series of ones and zeros. The digital data stream is then electronically compared against a look-up table to translate the binary-coded data back into human readable, alpha/numeric characters.

While the camera described above was termed a "portable camera", a camera apparatus of the same type may also be used in a fixed station environment. Portable cameras are typically hand held and are useful for field applications, while fixed station cameras are useful for capturing symbols from a distance and may be combined with magnifying apparatus to enhance the image-capturing capabilities of the camera.

Fixed station cameras generally are used in combination with one or more external adjustable lighting units having specialized applications or accessories, such as additive lighting and subtractive lighting. Additive lighting involves the use of artificial lights or reflectors increase light to the optical area of interest to be imaged (FIG. 5 shows an external light source 261 arranged to provide additive lighting L). Subtractive lighting uses screens or diffusers to remove or lower the light intensity of the optical area of interest.

In addition, fixed station cameras generally have manual adjustment capabilities to enhance depth of field, light input and focus. Portable cameras are equipped with built-in lighting capabilities which project visible light onto the symbol.

Fixed focus cameras are provided with shrouded windows (which typically are either open or covered with glass) that must be applied directly over the symbol to enable symbol capture while also blocking out external light that can strike the symbol at an angle and produce glare.

Built-in lighting used in the portable or fixed cameras of the present invention is provided by light emitting diodes (LEDs). LEDs are used because of their high reliability, durability, long life (typically 100,000 hours or more), low power requirements and excellent mechanical, thermal and optical stability.

However, LEDs emit a harsh, hard light composed of focused, direct, parallel rays which originate from a comparatively small or "point" light source. LED light provides excellent contrast between the bright and shadowed areas of the image, but the detailed contrast hinders data capture operations because it accentuates surface flaws which are perceived by the decoding software to be a part of the symbol. The harsh light also produces glare when projected onto reflective surfaces. As a result, this type of camera has typically been restricted to applications where surface finishes and background color are rigidly controlled, as for example on printed labels or tags, and surfaces coated with flat matte coatings.

However, the present invention overcomes these problems by the placement of an annular light-diffusing element 250 (see FIG. 6) in front of the LED array and the camera's lens above the symbol to be optically imaged.

Preferably, the light diffusing element 250 of the present invention is fabricated from a plastic material, and most preferably from a polyester plastic film.

The light-diffusing element shown in the Figures is preferably mounted on the camera at the open end 244 of the camera housing, as for example by bonding the element onto a rigid mounting frame which is attached directly to the camera head 206, or by bonding the element itself directly over the open end of the camera head 206.

One material used by the inventors for the light-diffusing element, which provided excellent results, was an opaque polyester plastic material, similar to that found in Tupperware or plastic milk cartons.

Another material which provided excellent results was a plastic diffusing film, identified as Number 116 Tough White Polyester Plastic Diffusing Film, 0.002" thick, obtained from Rosco Laboratories, 36 Bush Avenue, Port Chester, N.Y.

10573. The thickness of the material requires attachment to a clear substrate to give the final structure a requisite stiffness. The diffusing film may also be bonded onto a rigid mounting plate and attached directly to the camera head, e.g., by a threaded or bayonet connection. Alternatively, the diffusing element may comprise a thin coating on a piece of plastic or glass covering all but the camera viewing window.

The enhanced data capture device of the invention uses an off-the-shelf CCD camera fitted with a prototype front end lighting head designed to eliminate specular reflection and the shadowing produced by surface irregularities. The lighting head comprises (a) a camera mounting head, (b) a light source mounting plate, (c) a series of light emitting diodes (LEDs), (d) two focusing beam lights, (e) a light diffuser, and (f) a low current power source and connecting cable.

Two LED light-producing configurations produced the optimum results. The first configuration consisted of 8 LED lights to project a 40-degree cone of low-intensity infrared radiation in the 830 nm to 950 nm range. The second configuration used 12 LED lights to project a red light in the 700 nm to 750 nm (near-infrared) range.

In the first configuration, the radiation was projected through a light diffuser which prohibited the reentry of direct, hard, white light. The diffuser includes a hole in the center for lens viewing. This configuration was developed for military applications, and was used to demonstrate the ability to capture machine readable symbols off rough metallic surfaces in total darkness using a light source outside of the visible spectrum.

In the second configuration, designed for normal applications, twelve red LEDs were used, and included four diffused and eight clear lights. The LED mounting plate and the CCD camera lens were recessed one and three-quarter inches into the light reflective mounting head, which is covered with a milky white light diffusing plate.

The two lighting heads, although slightly different in design, operate using the same principles. That is to say, both project focussed, radiant light through a diffuser fabricated from polyester plastic which breaks up and scatters the light. The resulting soft diffused light strikes the surface from many different angles, filling surface recesses that produce shadows under direct, hard lighting conditions.

The reflected light returned to the camera is likewise diffused and bounced around the reflective surfaces of the camera head to limit the amount of focussed, direct light received by the camera.

In the symbol-focusing step, the camera's trigger is depressed and held in a first position to activate the camera's autofocusing mechanism or, in the case of a fixed focus camera, to activate a pair of laser focusing beams. Laser focusing beams are used in fixed focus cameras reduce camera cost and complexity. The laser beams are used to establish the proper distance between the camera lens and the part marking by adjusting the distance between the camera and the part marking to be imaged. This is done by placing the camera in close proximity to the part marking and then backing away until the two beams converge into a single dot located at the center of the marking.

In the symbol imaging step, the camera's trigger is depressed to a second position where the focusing beams are deactivated and the LED array in the camera is activated to provide a light source. The light passes through the light diffusing element whereupon it is scattered so that it is softened when the light strikes the substrate on which the marking is carried. The distance between the LEDs and the diffusing element is determined such that the amount of light passing through the central opening of the diffuser element is minimized.

After the lights reach full intensity, a frame grabber board is actuated so that a single frame of the live analog video stream is captured and converted to a digital signal (RS-232) format such that the digital signal can be processed by a computer.

The reformatted signal is then directed to the machine readable marking decoding software package which translates the coded binary data (ones and zeros) into an ASCII text file (human readable format). This information is then displayed on a video monitor and/or passed to the user's host computer.

Figure 7:
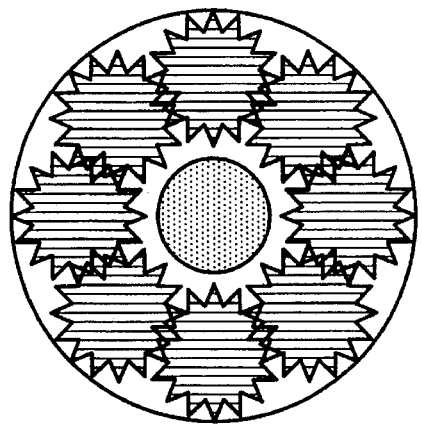
FIG. 7 depicts the light pattern on the surface of the diffuser, when the diffuser element is positioned at the proper distance from the internal camera light source.

FIG. 7 depicts a light pattern formed on the diffusing element 250, and this pattern is the result of the light diffusing element being disposed at a substantial distance from the LED array. The special relationship shown in this Figure between the LED array and the diffusing element produces a soft, even lighting of the encoded symbol.

FIGS. 8a–8f depict various arrangements in which external lighting is used to enhance illumination of the symbol on the substrate surface.

FIG. 8a shows a lighting technique known as "frontal illumination". Here, the area of interest is flooded with light so that the surface characteristics stand out in the image. This technique is used to find heavily contrasting symbols applied using marking methods which do not heavily disturb the surface, such as laser marking, paint stencil, ink jet marking, etc.

FIG. 8b shows a "dark field specular illumination" technique in which reflecting light strikes a specular or mirror surface at an angle that is equal or opposite to the incident ray. The only illumination that is returned to the sensor, when it is positioned at an angel other than the reflected angle, is scattered energy from a perturbation in the surface. This technique works well for symbols that have been applied using marking methods which disturb the surface and do not provide heavy contrast. The background should appear totally dark with the symbol creating the only signal amplitude change.

FIG. 8c shows a "light field" specular illumination technique which is similar to the technique shown in FIG. 8b, except that the sensor is positioned in line with the reflected ray. The only time reflected light is not transmitted back to the array is when a deformity of the specular surface exists. This method is also used to image symbols applied using marking methods which disturb the surface. The uniformity of illumination is very important when using this technique, since the defect contrasts may be small with respect to the entire output signal amplitude.

FIG. 8d shows illumination of an object using a beam splitter, or optical element which enables reflection of a portion of the optical energy that strikes it and transmission of the remainder. Beam splitters appear transparent and generally are spectrally non-selective. The ratio of transmission to reflectivity is typically established by design; in a device having such a ratio of 1 to 1, the maximum amount of source energy that can reach the sensor from the source is 25%. Hence the technique is not very light efficient.

The purpose of the beam splitter is to transmit illumination along the same axis as the scanner. In this way, the sensor can view objects that would otherwise be difficult or impossible to illuminate.

FIG. 8e shows illumination of an object where a linear or circular sensor is required as well as a front surface mirror with an aperture portion of coating removed in order to produce a result similar to the beam splitter result. In this "split mirror" approach, the illumination is more efficient, and hence there are lower illumination intensity requirements.

FIG. 8f shows an offset light source for producing shadows of features in order to define the location of the features. This technique may be used with raised or recessed symbols.

The image-capturing method of the present invention involves pressing the head of a hand-held or fixed station optical imaging CCD camera into contact with the component surface in the vicinity of the symbol to be captured by the camera. Proper placement of the camera head over the symbol is evident when the symbol image is centered on a video monitor which forms a part of the imaging camera. At that time, the operator can depress a trigger located on the camera to instantaneously capture a symbol image. The analog image is then converted to a train of digital signals which are processed via a decoder software package (see assignee's co-pending application referred to above). The software is provided to facilitate decoding of the data contained in the symbol, and may either be installed in the portable unit, or provided with a desktop or laptop computer processor and monitor apparatus with which the imaging apparatus of the present invention is intended to be used.

Most preferably, the decoder package is located in the handle or elsewhere in the housing of the imaging camera assembly. The decoded signals are sent to a CPU/display device, such as the laptop or desktop computer mentioned above, where human readable information is produced.

The imaging camera of the present invention thus provides an operator with real-time images that can be decoded so that the encoded information contained in the symbol located on the component surface can be quickly and efficiently obtained.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of optically imaging information-containing symbols on a surface, comprising:

positioning an imaging assembly of a camera over an information-containing coded symbol located on said surface, said imaging assembly including an imaging sensor, a lens, lighting means adjacent said lens, and light-diffusing means having an aperture formed therein, said aperture located between said coded symbol and said lens and lighting means, said aperture being aligned between the lens and said symbol, wherein no substantial portion of ambient light which is reflected from the surface can be reflected through said aperture directly into said lens;

focusing light reflected off the coded symbol and directed through the lens to the imaging sensor;

actuating said lighting means to project light through said light-diffusing means to said surface, without any substantial portion of light from said lighting means being directed through said aperture; and actuating said imaging assembly to capture an image of said coded element.

2. The method of claim 1, and further including the step of decoding said coded symbol.

3. The method of claim 1, wherein said coded symbol comprises a bar code symbol.

4. The method of claim 1, wherein said coded symbol comprises a matrix coded symbol.

5. The method of claim 1, wherein said coded symbol comprises an optical character recognition marking.

6. The method of claim 4, wherein said coded symbol comprises a Vericode® symbol.

7. The method of claim 1, wherein said light-diffusing element comprises a plate including an annular diffusing region and an annular voided region, said annular voided region being said aperature, and said step of moving said imaging assembly to a position atop said coded symbol further comprises aligning said voided region with said lens assembly and said symbol.

8. The method of claim 7, wherein said step of actuating said imaging assembly is preceded by a step of illuminating said surface with auxiliary lighting.

9. The method of claim 8, wherein said auxiliary lighting comprises light sources not carried by said camera.

10. Apparatus for optically imaging information-containing symbols located on a surface, comprising:

an optical camera including illuminating means for lighting said surface, and a lens assembly disposable over an information-containing symbol located on said surface, said illuminating means being disposed about said lens assembly, a light-diffusing element positioned between said symbol and said lens assembly, said diffusing element having an aperture formed therein; and, light diffusing sidewalls for spaceably positioning said light-diffusing element from said lens assembly and illuminating means, said sidewalls for diffusing ambient light reflected from said surface through said aperture.

11. The apparatus of claim 10, and further including means for supporting said diffusing element from said camera.

12. The apparatus of claim 11, wherein said light diffusing sidewalls are matte white.

13. The apparatus of claim 10, wherein said camera further includes a protective casing surrounding said lens assembly, and said second voided region of said diffusing element is secured to said lens assembly.

14. Apparatus for optically enhancing the image of an information-containing symbol obtained from a surface using a non-contact optical camera, comprising:

an optical diffuser element positionable between said surface and lens of said camera, said diffuser element having a voided region alignable with the symbol and the lens at a distance to limit the amount of ambient light from being reflected directly into the lens without being diffused.

15. The apparatus of claim 14, and further comprising means for attaching said diffuser element to the exterior of the camera.

16. The apparatus of claim 14, wherein said diffuser element comprises a thin disc of plastic material.

17. The apparatus of claim 16, wherein said plastic material is a polyester plastic film.

* * * * *